Dec. 16, 1952     O. B. HARTRAMPF     2,621,957
CAKE TURNER
Filed Nov. 13, 1950
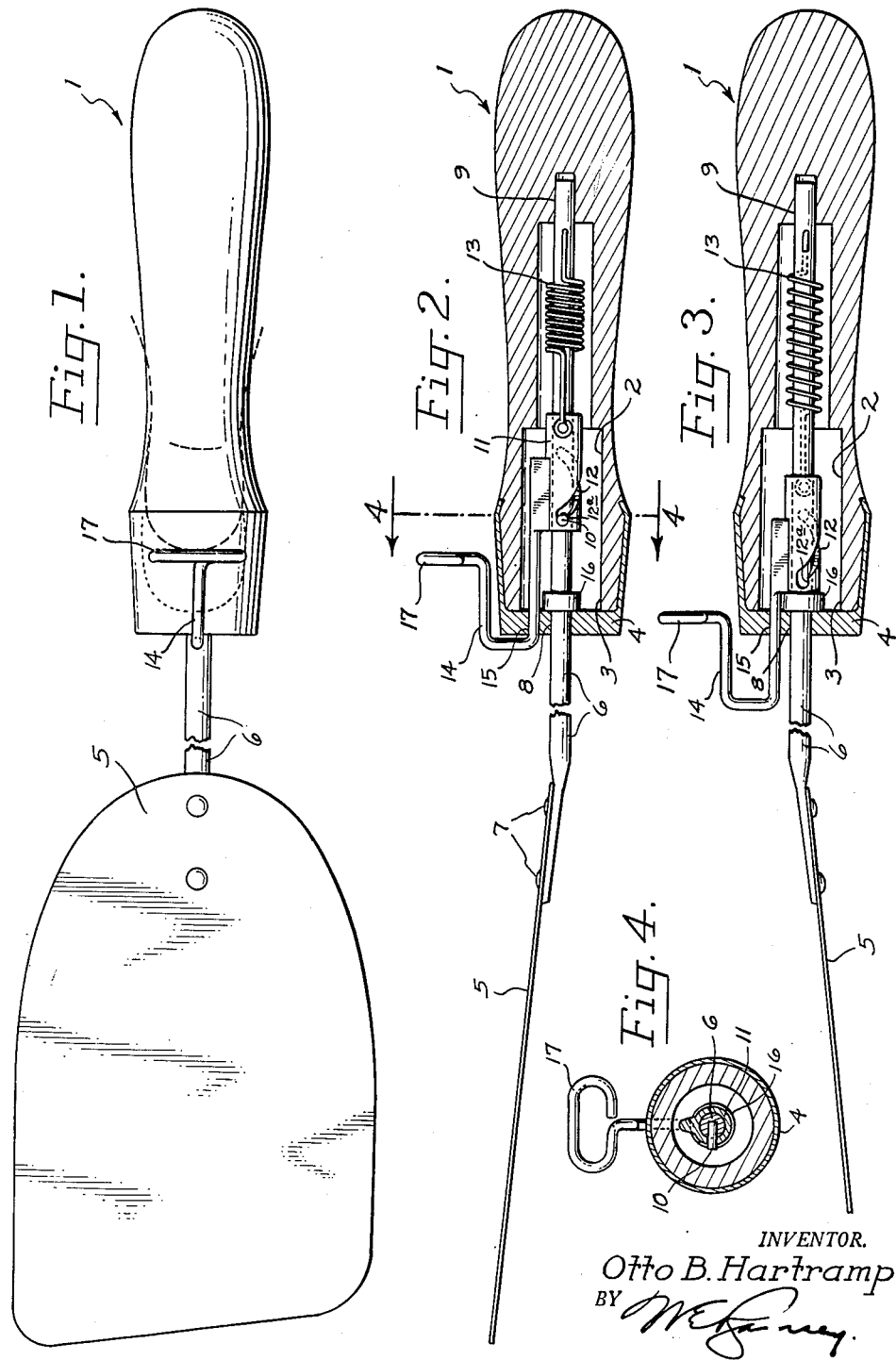
INVENTOR.
Otto B. Hartrampf
BY
Atty.

Patented Dec. 16, 1952

2,621,957

UNITED STATES PATENT OFFICE 2,621,957

CAKE TURNER

Otto B. Hartrampf, Hillsboro, Oreg.

Application November 13, 1950, Serial No. 195,426

4 Claims. (Cl. 294—8)

This invention relates to a structure for automatically turning pancakes, fish cakes, or the like, such structure being designated a "cake turner" in the art.

One object of my invention is to provide a novel thumb push plate and actuation mechanism for a cake turner whereby a cook or housewife may move the push plate to turn a cake while maintaining a secure grip on the turner handle with all five fingers.

The conventional cake turner includes a flat, cake-engaging blade which is secured to the handle by means of an elongated stem. Actuation mechanism, such as a rack and pinion, threaded shaft and spindle, or other means to translate reciprocation to rotation, is mounted on the handle in operative engagement with the stem. When a pancake is to be turned, the cook or housewife slides the blade under the cake and lifts it free of the pan or griddle while gripping the handle with all five fingers. Thereafter, the thumb is raised or moved to the side to engage and operate the actuation mechanism. This turns the cake and deposits it in the pan to cook the opposite side.

As has been noted, the structure of the conventional cake turner requires that the thumb be lifted from the handle to engage an actuation mechanism when a cake is to be turned. I find such a requirement to be a disadvantage since only four fingers remain in gripping relationship about the handle. Furthermore, these four fingers are all disposed about the lower half of the handle. Such a one-sided grip is somewhat insecure and tends to make for a sloppy turning operation—the cakes occasionally slipping when the turner inadvertently tilts. With my novel structure, however, the thumb need not be lifted from the handle to effect an operation. Instead, the thumb need only be pushed longitudinally along the handle and a sliding contact is maintained between the thumb and handle during actuation. Thus, one of the advantages of my invention is that all five fingers are maintained in gripping relationship with the handle at all times to obviate inadvertent slipping and tilting. This makes for a secure grip and a clean turning operation.

I have also found a second disadvantage to be inherent in the conventional cake turner structure. Thus, the actuation mechanism for most such structures is disposed either entirely or partially exterior to the hollow handle. With some types, a rack or threaded shaft is thus exposed. With others, a spring, sleeve, or pinion is exposed. This is unfortunate from a sanitary standpoint since all turners are prone to pick up grease and batter. Thus, while cooking pancakes, it is almost impossible to prevent some grease spatter from accumulating on these exposed parts. Furthermore, when the turner is washed, these exposed parts are subject to the action of soapy water. This tends to rust the parts and make them bind during operation.

Accordingly, another object of my invention is to provide a sealed operating chamber within the hollow bore of a cake turner handle. All my actuation mechanism is disposed within this chamber so as to be protected from spattered grease, spilled batter, and the deleterious effects of soapy dishwater. Only a complete immersion of the handle will cause water to find its way into my operating chamber and such an immersion is not required since dirt and grease cannot spatter therein so as to require an internal cleaning.

These and other objects and advantages of my invention will be hereinafter set forth in the following detailed description taken in conjunction with the accompanying drawing, in which:

Fig. 1 is a perspective view of my cake turner showing the thumb of a cook or housewife in sliding contact with the handle while in position to move the actuating push plate longitudinally to turn a pancake;

Fig. 2 is a sectional side view, taken substantially at right angles to Fig. 1, showing the operating mechanism of my cake turner in position before a turning operation;

Fig. 3 is a sectional side view similar to Fig. 2 but showing the operating mechanism in the position assumed after a pancake is turned; and Fig. 4 is a detailed section view, taken substantially on the line 4—4 of Fig. 2, more particularly indicating the lateral pin projecting from the turner stem and the manner in which this pin engages the helical slot carried by my hollow sleeve.

I generally indicate the wood, metal, or plastic handle of my cake turner by the numeral 1. This handle is provided with a hollow bore 2 which is open to one end as at 3. The open end 3 is sealed to define an operating chamber within the hollow bore 2. Any conventional structure may be utilized to accomplish this seal but I prefer to crimp the margin of a ferrule 4 about the exterior surface of the handle 1 so the medial portion thereof extends laterally across the open end 3.

The cake turner blade 5 is secured to an elongated stem 6 by rivets 7 or other fastening means. A medial portion of the stem 6, in turn, is rotatably carried by an axial aperture 8 which pierces the ferrule 4. The terminal end of the stem 6 is rotatably carried by the handle 1 in any convenient manner. In my preferred embodiment, this is done by means of an axial recess 9 formed in the closed end of the hollow bore 2. Thus, the aperture 8 and recess 9 carry the stem 6 in axial alignment within the handle 1 and mount the stem for rotation about the longitudinal axis of the handle.

I prefer to mount my actuation mechanism within the sealed operating chamber defined by the hollow bore 2. To this end, a lateral pin 10 is secured to the stem 6 at a point located within the chamber. A hollow sleeve 11 slidably encompasses the stem 6 and carries a helical slot 12 in operative engagement with the lateral pin 10. The slot 12 terminates in a longitudinal straight portion 12a. A tension spring 13 is secured to one end of the sleeve 11 and to the stem 6 so as to bias the sleeve for movement toward the closed end of the hollow bore 2. Thus, as the sleeve 11 is moved longitudinally against the bias of the spring 13, the helical slot 12 engages the lateral pin 10 and rotates the stem 6 through 180°. Until this conscious longitudinal movement takes place, however, the slot straight portion 12a engages the pin 10 to anchor the same against rotation. Thus, inadvertent rotation of the stem 6 is prevented by the portion 12a.

To move the sleeve 11 longitudinally, I secure to or make integral therewith a U-shaped push rod 14 having two parallel legs and a connecting section. One parallel leg of the push rod 14 is slidably carried in a second aperture 15 formed in the ferrule 4. The other parallel leg thereof lies exterior the handle 1 and is disposed parallel to the longitudinal axis of the handle. A collar 16 prevents longitudinal movement of the stem 6 and the push rod 14 terminates in a thumb push plate 17. I prefer to dispose the thumb push plate 17 perpendicular to the longitudinal axis of the handle 1 in order that the thumb of a cook or housewife may push thereagainst while sliding along the handle during an operation of the cake turner. Thus, the thumb does not need to be lifted from the handle in order to operate my cake turner. Rather, all five fingers are maintained in gripping relationship with the handle. This makes for a secure grip and a clean pancake turning operation with no inadvertent tilt or slip.

In the operation of my cake turner, the actuation mechanism, initially, is in the position shown in Fig. 2. When a pancake is to be turned, the cook or housewife grips the handle 1 with all five fingers secured thereabout. The bent thumb rests along the top of the handle in contact with the push plate 17. The blade 5 is then slipped under the pancake and lifted free of the griddle or pan. Thereafter, the thumb is extended longitudinally to move the push plate 17 and the actuation mechanism to the position shown in Fig. 3. This movement causes the U-shaped push rod 14 to move the hollow sleeve 11 longitudinally. The sleeve movement causes the helical slot 12 to engage the lateral pin 10 and rotate the stem 6 and blade 5 through 180°. This deposits the pancake bottom side up on the griddle but does not expose any of the mechanism within the hollow bore 2 to spattering grease. Thereafter, the thumb is slid back along the handle by bending the first joint thereof and the tension spring 13 causes the actuation mechanism to again assume the position shown in Fig. 2.

During all of the above described movement, it will be noted, none of my actuation mechanism is exposed to the spatter of grease or batter since such mechanism is mounted within the sealed chamber defined by the hollow bore 2 and ferrule 4. Furthermore, when my cake turner is to be washed, only the blade portion need be immersed in water. The exterior of the handle and push plate can be cleaned by running a damp cloth thereover or by holding the turner in a blade down position under a faucet. The actuation mechanism is thus protected from the deleterious effects of soapy dishwater and the operating parts will not bind even after long use and many washings.

I claim:

1. A cake turner, comprising an elongated handle having a hollow bore with one open end and one closed end, a ferrule secured laterally across said open end in sealing relationship to define an operating chamber within said bore, said ferrule being pierced by an axially disposed aperture, an axial stem rotatably mounted in the closed end of said bore and in said aperture to protrude beyond said ferrule, said stem carrying a laterally projecting pin, a hollow sleeve slidably encompassing said stem and having a helical slot therein operatively engaged with said pin, said helical slot terminating in a longitudinal straight portion, spring means bearing on said sleeve to bias the same in a direction engaging said straight portion with said pin, and means for moving said sleeve axially against said bias sequentially to slide said slot straight portion out of engagement with said pin and to slide the remainder of said slot over said pin to rotate said stem, said means including a U-shaped push rod having one leg thereof lying exterior to and parallel the longitudinal axis of said handle.

2. A cake turner, comprising an elongated handle having a hollow bore with one open end and one closed end, a ferrule secured laterally across said open end in sealing relationship to define an operating chamber within said bore, said ferrule being pierced by a first axial aperture and by a second parallel aperture, an elongated stem disposed axially of said chamber, said stem being rotatably mounted in said first axial aperture and in the closed end of said bore, a collar encompassing said stem and sealingly engaging said ferrule first aperture, and means operatively engaging said stem within said operating chamber for rotating said stem, said means including a U-shaped push rod having one parallel leg slidably and sealingly carried by said second aperture and one parallel leg lying exterior to and parallel the longitudinal axis of said handle.

3. A cake turner, comprising an elongated handle having a hollow bore with one open end and one closed end, a ferrule secured laterally across said open end in sealing relationship to define an operating chamber within said bore, said ferrule being pierced by a first axial aperture and by a second aperture, an elongated stem disposed axially of said chamber and carrying a blade on the terminal end thereof, said stem being rotatably mounted in said first axial aperture and in the closed end of said bore and carrying a lateral pin, a sleeve slidably encompassing said stem and operatively engaging said pin, and means operatively engaging said sleeve within said operating chamber for rotating said stem, said means including a U-shaped push rod having a short connecting section joining one parallel leg slidably carried by said second aperture and one parallel leg lying exterior to and parallel the longitudinal axis of said handle, said exterior leg terminating in a thumb push plate disposed substantially perpendicular to the said axis of the handle, said thumb push plate being carried closely adjacent the exterior of said handle to accommodate actuation by a push of the thumb while the thumb maintains slidable contact with the exterior of said handle.

4. A cake turner, comprising an elongated handle having a hollow bore open to one end thereof, means closing said open end to define a chamber within said bore, an elongated stem rotatably carried by said means and protruding therethrough into said chamber, said stem having a pin projecting laterally therefrom within said chamber, a hollow sleeve slidably encompassing said stem and carrying a helical slot in operative engagement with said pin, said slot terminating in a longitudinal straight portion, said sleeve being spring biased for longitudinal movement away from the open end of said bore to engage said pin in said slot straight portion and prevent inadvertent rotation of said stem, and means for moving said sleeve longitudinally against said bias to rotate said stem.

OTTO B. HARTRAMPF.

REFERENCES CITED

The following references are of record in the file of this patent:

UNITED STATES PATENTS

| Number | Name | Date |
|---|---|---|
| 657,801 | Vogel | Sept. 11, 1900 |
| 681,662 | Tomaskoff | Aug. 27, 1901 |
| 1,109,523 | Frey et al. | Sept. 1, 1914 |
| 1,553,239 | Giannico | Sept. 8, 1925 |

FOREIGN PATENTS

| Number | Country | Date |
|---|---|---|
| 177,515 | Canada | June 12, 1917 |